United States Patent

Van Ochten et al.

[11] Patent Number: 5,955,855
[45] Date of Patent: Sep. 21, 1999

[54] METHOD AND SYSTEM FOR TUNING A DRIVE TO ITS COUPLED MOTOR TO MINIMIZE MOTOR RESONANCE AND SENSING DEVICE FOR USE THEREIN

[75] Inventors: Mitchell G. Van Ochten; Raymond Mailhot, both of Livonia, Mich.

[73] Assignee: Medar, Inc., Farmington Hills, Mich.

[21] Appl. No.: 08/833,728

[22] Filed: Apr. 9, 1997

[51] Int. Cl.⁶ ................................................. G05B 13/00
[52] U.S. Cl. ........................... 318/560; 318/561; 318/632
[58] Field of Search ................................. 318/560–640; 280/707, 714; 494/7, 10, 16; 73/581, 457, 460, 462, 622; 364/507, 551.02

[56] References Cited

U.S. PATENT DOCUMENTS

| | | | |
|---|---|---|---|
| 3,832,630 | 8/1974 | Micol et al. | 324/56 |
| 3,854,340 | 12/1974 | Bell et al. | 73/517 R |
| 3,967,178 | 6/1976 | Morris | 318/648 |
| 4,060,716 | 11/1977 | Pekrul et al. | 364/576 |
| 4,284,942 | 8/1981 | Bigley et al. | 318/618 |
| 4,300,383 | 11/1981 | Zinn et al. | 73/11 |
| 4,454,463 | 6/1984 | Popescu | 322/4 |
| 4,511,312 | 4/1985 | Hartwig | 417/45 |
| 4,531,699 | 7/1985 | Pinson | 248/550 |
| 4,677,353 | 6/1987 | Shieh | 318/128 |
| 4,751,657 | 6/1988 | Imam et al. | 364/508 |
| 4,765,648 | 8/1988 | Mander et al. | 280/707 |
| 4,947,093 | 8/1990 | Dunstan et al. | 318/560 |
| 4,975,855 | 12/1990 | Miller et al. | 364/507 |
| 5,496,254 | 3/1996 | Keller et al. | 494/7 |
| 5,697,634 | 12/1997 | Kamimae et al. | 280/707 |

*Primary Examiner*—Paul Ip
*Attorney, Agent, or Firm*—Brooks & Kushman P.C.

[57] ABSTRACT

A method and system are provided for tuning a drive to its coupled stepper motor to minimize motor resonance wherein an electronic accelerometer is mounted in a coupler such as a slip clutch to sense angular accelerative forces of an output shaft of the motor. The slip clutch is slid over the output shaft to permit rapid coupling to and decoupling from the output shaft. The slip clutch is preferably spring-loaded to allow for a relatively constant grip to the output shaft over a normal range of shaft tolerances. A signal generated by the accelerometer is processed to obtain an output signal which is displayed to indicate variations in the angular accelerative forces. The drive is then adjusted to reduce the motor resonance based on the displayed variations.

20 Claims, 2 Drawing Sheets

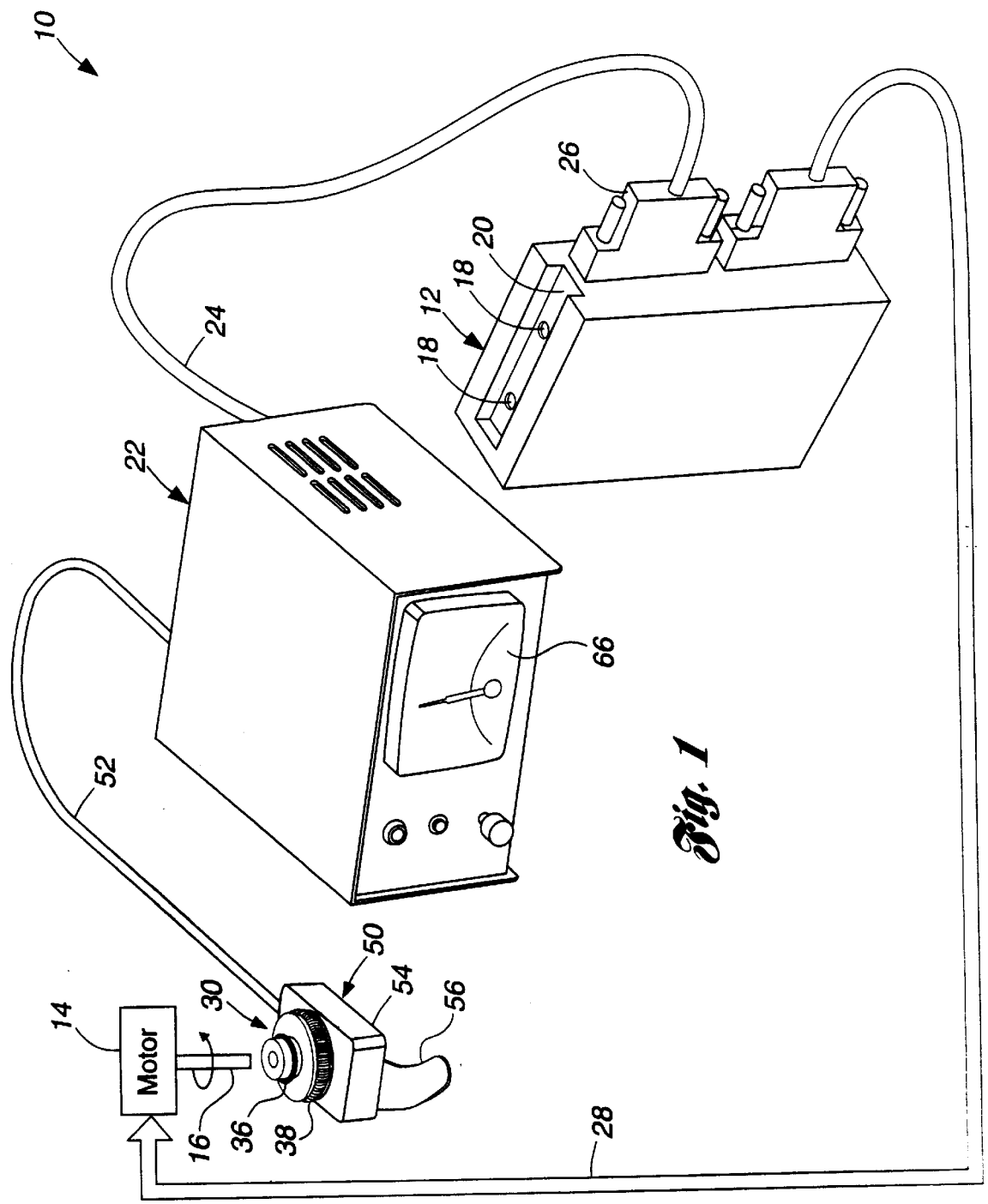

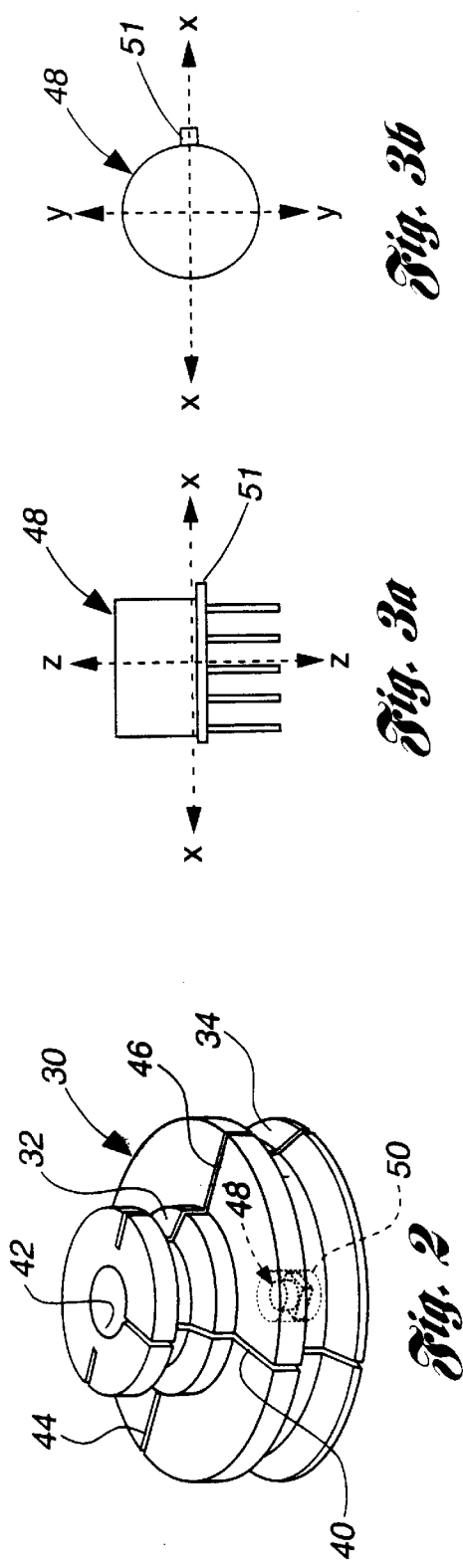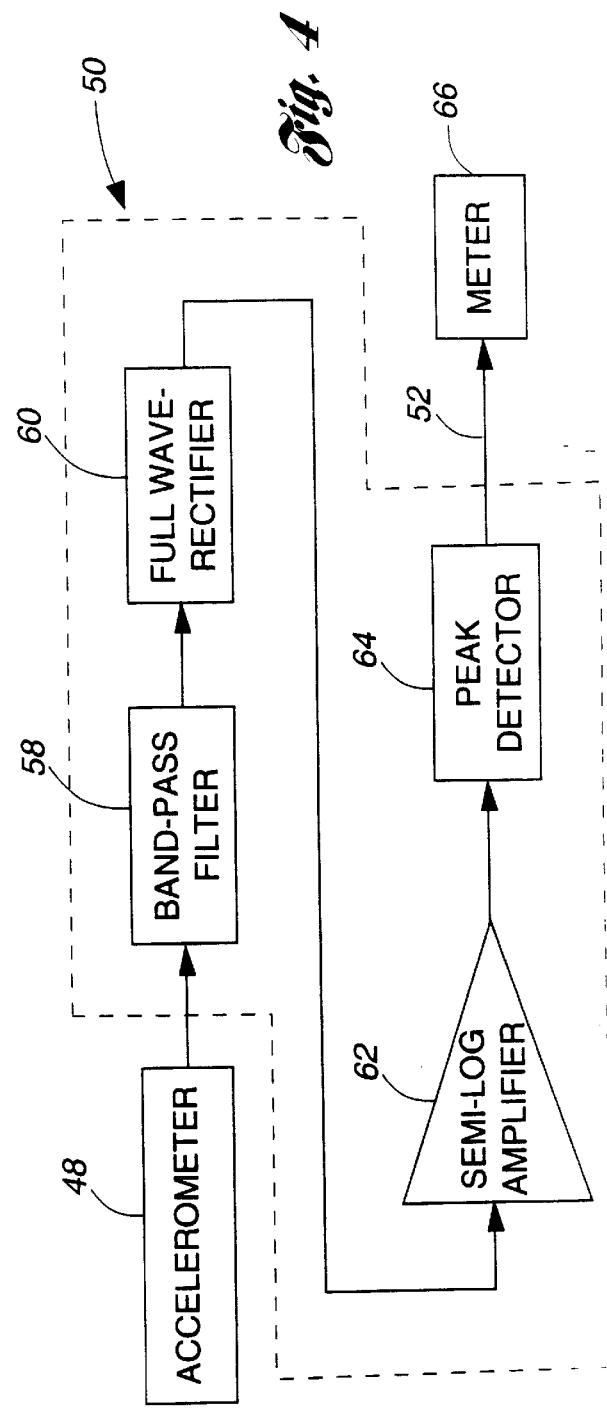

METHOD AND SYSTEM FOR TUNING A DRIVE TO ITS COUPLED MOTOR TO MINIMIZE MOTOR RESONANCE AND SENSING DEVICE FOR USE THEREIN

TECHNICAL FIELD

This invention relates to methods and systems for tuning drives coupled to their respective motors and, in particular, to methods and systems for tuning drives coupled to their respective motors to minimize motor resonance and sensing devices for use therein.

BACKGROUND ART

Resonance exists in electrical stepper motors and is a function of the motor's mechanical construction. Resonance can cause the motor to stall at low speeds.

Most full step motor controllers jump the motor to a set minimum starting speed that is greater than the resonance region. Motors that will not accelerate past a relatively low RPM may be stalled due to resonance.

The drive to a motor can be tuned to minimize resonance and optimize smoothness by adjusting circuit elements such as small potentiometers accessible to a user of the unit. Such potentiometers may adjust a DC offset of one or more phase currents. Since tuning is affected by operating current, such circuit elements may have to be adjusted during the configuration or installation process.

There are several methods that one can use to determine the level of motor resonance in a system.

Tachometer Method

Use an oscilloscope to gauge the output of a tachometer attached to the motor shaft. The tachometer will output a DC voltage, proportional to speed. This voltage will oscillate around an average voltage when the motor is resonating. The amplitude of this oscillation will be at its maximum when you run the motor at its resonance speed. The goal of this tuning method is to tune the motor for its lowest oscillation amplitude.

Sounding Board Method

One can practice his or her tuning skills with an unloaded motor placed on a sounding board or table. When one commands a velocity that is near the motor's resonance speed, the phenomenon will cause an audible vibration. The goal of this tuning method is to tune the motor for the least amount of vibration.

Stethoscope Method

When one tunes his or her motor under loaded conditions, one can hear the audible vibration caused by the motor's natural frequency by placing the tip of a screw driver against the motor casing and placing the handle of the screw driver close to one's ear (as you would a stethoscope). You will also be able to hear the different magnitudes of vibration caused by the motor's natural frequency. The goal of this tuning method is to tune the motor for the least amount of vibration.

Touch Method

After one has had some experience with tuning, one should be able to locate the motor's resonance speed by placing your fingertips on the motor shaft and adjusting the motor's velocity. Once the resonance speed is located, one can tune the motor for maximum smoothness in the same way.

Typically, in order to tune the drive to its coupled motor, the drive must be commanded so that the coupled motor runs at maximum roughness for a first speed motor resonance. Then the circuit elements of the drive are adjusted for best smoothness. Then, the drive is commanded to achieve a second speed resonance until the motor again runs rough. Then the circuit elements are again adjusted for best smoothness. Then the steps are repeated until no further improvement is noted.

The above techniques for tuning a drive to its motor present a number of problems. For example, in the above-noted Tachometer Method, an oscilloscope is required which may not always be readily available. Also, with respect to the Sounding Board Method, the motor must be tuned prior to installation which is not always possible. Finally, with respect to the Stethoscope Method, this technique is somewhat dependent on operator skill and is not always possible to employ depending on the level of background noise.

Consequently, there is a need for a quick, easy, and relatively inexpensive method and system tune a drive to its coupled motor.

SUMMARY OF THE INVENTION

An object of the present invention is to provide a method and system for tuning a drive to its coupled motor to minimize motor resonance and a sensing device for use therein which can be employed quickly and can be employed in a relatively noisy factory environment where other techniques are not feasible.

In carrying out the above object and other objects of the present invention, a method is provided for tuning an adjustable drive to its coupled motor to minimize motor resonance. The method includes the steps of energizing the drive to rotate an output shaft of the motor, generating an electrical signal representative of angular accelerative forces of the rotating output shaft and processing the electrical signal to obtain an output signal. The method also includes the steps of indicating variations in the output signal which indicate changes in the angular accelerative forces and adjusting the drive to reduce the motor resonance based on the indicated variations.

Preferably, the step of processing includes the step of measuring the electrical signal to obtain the output signal and the step of indicating includes the step of displaying the output signal.

Further in carrying out the above object and other objects of the present invention, a system is provided for tuning an adjustable drive to its coupled motor to minimize motor resonance. The system includes a sensor for sensing angular accelerative forces and providing an electrical signal representative of the angular accelerative forces. The system also includes a coupler adapted to be coupled to a rotary output shaft of the motor to allow rotation of the output shaft and to couple the sensor to the output shaft for sensing the angular accelerative forces of the output shaft. The system further includes a signal processor for processing the electrical signal to obtain an output signal and an output device coupled to the signal processor to receive the output signal and provide a visual display of the angular accelerative forces based on the output signal.

Preferably, the coupler is a slip clutch and still preferably, the slip clutch is spring-loaded.

Also, preferably, the sensor is an electronic accelerometer having a sensitive axis and wherein the accelerometer is mounted on the coupler so that the sensitive axis is substantially parallel to the angular accelerative forces of the output shaft.

Still further in carrying out the above object and other objects of the present invention, an angular accelerative force sensing device for generating an electrical signal representative of angular accelerative forces of a rotating shaft is provided. The device includes a coupler adapted to be coupled to the rotating shaft to allow rotation of the output shaft and an electronic accelerometer having a sensitive axis mounted on the coupler so that the sensitive axis is substantially parallel to the angular accelerative forces of the output shaft. The coupler couples the accelerometer to the output shaft to sense the angular accelerative forces of the output shaft.

A method, system and sensing device constructed in accordance with the present invention provides numerous advantages. For example, visual indication can be provided to permit ease of adjustment of the tuning process. Also, the method, system and sensing device permit rapid connection to and from the drive and its coupled motor while still allowing for a relatively constant grip by the sensing device over a normal range of shaft tolerances.

Also, the method, system and sensing device provide for the use of an electronic accelerometer to sense the rotating motor shaft vibrations and may be used in a noisy factory environment where other techniques are not feasible.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic diagram illustrating a method and system for tuning an adjustable drive to its coupled motor in accordance with the present invention;

FIG. 2 is a perspective view of an angular accelerative force sensing device constructed in accordance with the present invention;

FIG. 3a is a side view of an accelerometer having a sensitive axis X;

FIG. 3b is a top plan view of the accelerometer of FIG. 3a; and

FIG. 4 is a schematic block diagram illustrating various electronic components of the system of the present invention.

BEST MODE FOR CARRYING OUT THE INVENTION

Referring now to the drawing Figures, there is illustrated in FIG. 1 a system, generally indicated at 10, for tuning an adjustable drive, generally indicated at 12, to its coupled motor 14. The motor is preferably an electrical stepper motor having a rotary output shaft 16. In general, the method and system of the present invention are provided to adjust the drive 12 to reduce resonance of the motor 14.

The drive 12 may be an adjustable drive having reference number OEM650/OEM650X made by the Parker Hanafin Corporation. Typically, the drive 12 can be tuned to minimize motor resonance and optimize smoothness by adjusting small potentiometers 18 located at a top surface 20 of the drive 12. For example, one of the potentiometers 18 adjusts DC offset of phase A current of the motor 12 and the other potentiometer 18 adjusts DC offset of phase B current of the motor 14. Since tuning is affected by operating current, the potentiometers 18 may be adjusted during configuration or the installation process.

In order to tune the adjustable drive 12, the adjustable drive 12 is first commanded by a command signal which is generated by a control unit, generally indicated at 22, along a cable 24 and coupled to the drive 12 by a connector 26. The signal from the control unit 22 energizes the drive 12 which, in turn, provides a drive signal along a cable 28 to the motor 14 to cause the output shaft 16 of the motor 14 to rotate.

The rotating shaft 16 is coupled to a coupler in the form of a slip clutch, generally indicated at 30, as best shown in FIG. 2, of a sensing device. The slip clutch 30 is preferably a pulley-type slip clutch having a pair of integrally-formed, grooved, peripheral portions 32 and 34 for receiving and retaining spring-like elements therein. For example, a resilient O-ring 36 is positioned in the portion 32 and a linear spring 38 is positioned in the portion 34 to spring-load the slip clutch 30 onto the rotating shaft 16.

As illustrated in FIG. 2, the slip clutch 30 includes a radial slit 40 which extends completely through the clutch 30 from its inner central hole 42. The slip clutch 30 also includes slits 44 and 46 which extend partially radially through the slip clutch at opposite sides thereof to allow the slip clutch 30 to flex so that the slip clutch 30 slidably grips the rotating shaft 16 over a normal range of shaft tolerances with a relatively constant force.

The slip clutch 30 allows rapid coupling to and decoupling from the motor shaft 16. The sensing device also includes an electronic accelerometer, generally indicated at 48, in FIGS. 2, 3a and 3b. The accelerometer 48 picks up angular accelerative forces from the shaft 16 when housed within the slip clutch 30 in a predetermined orientation. The accelerometer 48 is preferably a single chip accelerometer with signal conditioning manufactured by Analog Devices, Inc. of Norwood, Mass. The accelerometer 48 is preferably a force-balanced capacitive accelerometer with the capability to measure AC accelerations such as vibration of a rotating shaft.

The accelerometer 48 is mounted within a cavity 50 formed in the slip clutch 30 as illustrated by phantom lines in FIG. 2. The accelerometer 48 is mounted in the cavity 50 within the slip clutch 30 so it is properly coupled to the rotating shaft 16 for which the acceleration is to be measured or sensed. Because the cavity 50 itself can resonate, preferably the cavity 50, once the accelerometer 48 is properly positioned therein with its sensitive axis X (as indicated in FIGS. 3a and 3b) located parallel to the angular accelerative forces of the output shaft 16, is filled with a suitable potting material or epoxy.

The sensitive axis X of the accelerometer 48 is the most sensitive axis of the accelerometer 48 and is defined by a line drawn between a tab 51 and a pin located on the opposite side of the accelerometer 48. The accelerometer 48 is a sensor designed to measure accelerations that result from applied accelerative forces and the accelerometer 48 responds to the components of applied accelerative forces on its sensitive X axis. The drawing FIGS. 3a and 3b show the relationship between the sensitive X axis and traverse Z and Y axes of the accelerometer 48.

An electrical signal generated and conditioned by the accelerometer 48 is processed by a signal processor, generally indicated at 50 in FIG. 4 to obtain an output signal on cable 52 (i.e. FIG. 1). The signal processor 50 is preferably an electronic circuit contained on a board within a housing 54 (i.e. FIG. 1) to which there is attached a leg 56 to ensures that the signal processor 50 as well as the slip clutch 30 to which the signal processor 50 is attached, does not rotate with the rotating shaft 16, but rather engages a relative stationary object to prevent rotation thereof but allow rotation of the shaft 16.

The signal processor 50, as indicated in FIG. 4, typically includes a bandpass filter 58 which allows most of the energy related to mistuning to pass therethrough while rejecting the DC component and high frequency noise provided by the accelerometer's voltage output signal. The accelerometer's electrical signal corresponds to changes in the angular acceleration of the rotating shaft 16 through the slip clutch 30 which acceleration is acerbated when the adjustable drive is out of tune.

The signal processor 50 also includes a full wave rectifier 60 which rectifies the filtered signal from the bandpass filter 58 to enable detection of both acceleration and deceleration.

The signal processor 50 also includes a semi-log amplifier 62 which takes the rectified signal from the full wave rectifier 60 and amplifies same to allow a high sensitivity for weak vibration while preventing overload of a meter 66 or other indicator of the central unit 22 for large vibrations.

Finally, the signal processor 50 includes a peak detector 64 which takes the amplified signal from the semi-log amplifier 62, captures the impulse-like changes in motor speed and holds the value for visual indication on the meter 66. The meter 66 can be either an analog indicator, a digital read-out or a bar graph-type display.

As previously mentioned, once the acceleration forces are displayed on the meter 66, a user can adjust one or both of the potentiometers 18 to minimize the accelerative forces generated and thereafter displayed on the meter 66. In this way, motor resonance can be minimized by tuning the driver 12 to its coupled motor 14.

While the best mode for carrying out the invention has been described in detail, those familiar with the art to which this invention relates will recognize various alternative designs and embodiments for practicing the invention as defined by the following claims.

What is claimed is:

1. A method for tuning an adjustable drive to its coupled motor to minimize motor resonance, the method comprising the steps of:

energizing the drive to rotate an output shaft of the motor;

generating an electrical signal representative of angular accelerative forces of the rotating output shaft;

processing the electrical signal to obtain an output signal;

indicating variations in the output signal which indicate changes in the angular accelerative forces; and adjusting the drive to reduce the motor resonance based on the indicated variations.

2. The method of claim 1 wherein the step of processing includes the step of measuring the electrical signal to obtain the output signal.

3. The method of claim 2 wherein the step of indicating includes the step of displaying the output signal.

4. A system for tuning an adjustable drive to its coupled motor to minimize motor resonance, the system comprising:

a sensor for sensing angular accelerative forces and providing an electrical signal representative of the angular accelerative forces;

a coupler adapted to be coupled to a rotary output shaft of the motor to allow rotation of the output shaft and to couple the sensor to the output shaft for sensing the angular accelerative forces of the output shaft;

a signal processor for processing the electrical signal to obtain an output signal; and an output device coupled to the signal processor to receive the output signal and provide a visual display of the angular accelerative forces based on the output signal.

5. The system as claimed in claim 4 wherein the coupler is a slip clutch.

6. The system as claimed in claim 5 wherein the slip clutch is spring-loaded.

7. The system as claimed in claim 4 wherein the sensor is an electronic accelerometer having a sensitive axis and mounted on the coupler so that the sensitive axis is substantially parallel to the angular accelerative forces of the output shaft.

8. The system as claimed in claim 4 wherein the signal processor includes a filter for filtering the electronic signal and providing a filtered output signal having energy corresponding to mistuning of the motor.

9. The system as claimed in claim 8 wherein the filter is a bandpass filter.

10. The system as claimed in claim 8 wherein the signal processor includes a rectifier for rectifying the filtered electrical signal to obtain a rectified signal corresponding to both shaft acceleration and shaft deceleration.

11. The system as claimed in claim 10 wherein the rectifier is a full-wave rectifier.

12. The system as claimed in claim 10 wherein the signal processor includes an amplifier for amplifying the rectified signal to obtain an amplified signal.

13. The system as claimed in claim 12 wherein the amplifier is a semi-log amplifier which allows high sensitivity for weak vibrations and low sensitivity for large vibrations in the rectified signal.

14. The system as claimed in claim 12 wherein the signal processor includes a detector for detecting portions of the amplified signal to obtain the output signal.

15. The system as claimed in claim 14 wherein the detector is a peak detector for detecting peaks of the amplified signal.

16. An angular accelerative force sensing device for generating an electrical signal representative of angular accelerative forces of a rotating shaft, the device comprising:

a coupler adapted to be coupled to the rotating shaft to allow rotation of the output shaft; and an electronic accelerometer having a sensitive axis and mounted on the coupler so that the sensitive axis is substantially parallel to the angular accelerative forces of the rotating shaft, the coupler coupling the accelerometer to the rotating shaft to sense the angular accelerative forces of the output shaft.

17. The device of claim 16 wherein the coupler is a slip clutch.

18. The device of claim 17 wherein the slip clutch is spring-loaded.

19. The device of claim 16 wherein the coupler includes a circular hole for receiving and retaining the rotating shaft therein.

20. The device of claim 16 wherein the coupler includes a cavity for receiving and retaining the accelerometer in a predetermined orientation therein.

* * * * *